US 6,666,408 B1

(12) United States Patent
De Carvalho et al.

(10) Patent No.: US 6,666,408 B1
(45) Date of Patent: Dec. 23, 2003

(54) CLOSURE FAULT INDICATOR, PARTICULARLY FOR AN AIRCRAFT ENGINE POD COWL

(75) Inventors: Eric De Carvalho, Tournefeville (FR); Eric Delmas, Brax (FR)

(73) Assignee: Aerospatiale Matra Airbus, Paris (FR)

( * ) Notice: Subject to any disclaimer, the term of this patent is extended or adjusted under 35 U.S.C. 154(b) by 68 days.

(21) Appl. No.: 09/689,830

(22) Filed: Oct. 13, 2000

(30) Foreign Application Priority Data

Nov. 10, 1999 (FR) .............................. 99 14121

(51) Int. Cl.⁷ ................................ B64C 1/14
(52) U.S. Cl. .................. 244/129.4; 244/53 R; 292/113
(58) Field of Search ............... 244/129.4, 53 R; 292/113

(56) References Cited

U.S. PATENT DOCUMENTS

| 4,150,802 A | 4/1979 | Evelyn et al. |
| 4,531,769 A | 7/1985 | Glancy |
| 4,613,099 A | 9/1986 | Smith et al. |
| 4,679,750 A | 7/1987 | Burhans |
| 4,982,474 A | * 1/1991 | Kjellstrom ............ 16/82 |
| 5,518,206 A | * 5/1996 | Arnold et al. ........ 244/129.4 |
| 6,148,607 A | * 11/2000 | Baudu et al. ......... 60/226.2 |
| 6,279,971 B1 | * 8/2001 | Dessenberger ....... 292/113 |
| 6,325,428 B1 | * 12/2001 | Do ...................... 292/113 |

FOREIGN PATENT DOCUMENTS

| EP | 0596070 | 5/1994 |
| GB | 2267122 | 11/1993 |

* cited by examiner

Primary Examiner—Michael J. Carone
Assistant Examiner—M. Thomson
(74) Attorney, Agent, or Firm—Thelen Reid & Priest LLP

(57) ABSTRACT

In order to avoid an operator forgetting to actuate locking mechanism interposed between two elements, such as the pod cowls (12, 14) of an aircraft engine, when said elements are in the closed position, use is made of a closure fault indicator. Said indicator comprises retractable abutment members (42, 44) automatically maintaining the two elements spaced from one another in a visible manner, when said elements are moved from their open position into their closed position.

10 Claims, 5 Drawing Sheets

CLOSURE FAULT INDICATOR, PARTICULARLY FOR AN AIRCRAFT ENGINE POD COWL

TECHNICAL FIELD

The invention relates to a closure fault indicator for locking means interposed between two elements able to occupy with respect to one another an open position and a closed position.

Such an indicator can in particular be used on an aircraft engine for immediately informing ground personnel of a closure fault or shortcoming of locking means interposed between the pod cowls of said engine.

PRIOR ART

Aircraft engine pods are normally equipped with cowls, whose opening gives access, when the aircraft is on the ground, to various equipments, systems, etc. for maintaining the same. When the aircraft is in flight, the cowls are closed and have a shape such that they ensure the aerodynamic continuity of the complete engine.

More specifically, the pod of a ducted turbofan engine is generally equipped with at least one pair of cowls, respectively to the right and left, which are placed around the engine fan. Each of the cowls has an approximately C-shaped cross-section in a transverse plane perpendicular to the longitudinal axis of the engine. A hinge makes it possible to articulate the upper edge of each of the cowls on the upper part of the engine. As a result of this arrangement it is possible to obtain access to various equipments of the engine, particularly for maintaining the same, by raising the cowls.

The lower edges of the cowls are also equipped with locking mechanisms for locking the cowls in their closed position when said mechanisms are actuated. Said locking mechanisms generally comprise a male part and a female part mounted on the respective lower edges of the cowls, so as to be cooperate with one another when the cowls are closed.

U.S. Pat. No. 4,531,769 relates to an improved locking mechanism for ensuring the closure of two cowls surrounding an aircraft engine. This knuckle joint-type mechanism comprises a main hook articulated on the lower edge of a first cowl, so as to be able to penetrate a complimentary opening linked with the other cowl. The position of the main hook is secured by the use of a second hook. The locking of the mechanism is controlled by depressing a handle.

When such a locking mechanism is installed on an aircraft engine, the situation may arise where the operator responsible for closing the cowls forgets to carry out locking or does not perform this operation in a satisfactory manner. Thus, when a locking mechanism like that described in U.S. Pat. No. 4,531,769 is used, it is possible to actuate the handle in the closing direction when the hook is not engaged in the complimentary opening linked with the other cowl. In this case, as in the hypothesis where the operator forgets to manipulate the locking mechanisms after lowering the cowls, it is virtually impossible to see that locking has not taken place or has not been performed in a satisfactory manner. Thus, as a result of their considerable weight, the cowls automatically arrive in position by gravity and their lower edges do not project beyond the air intake. Moreover, existing locking mechanisms do not have really projecting portions making it possible to indicate to the operator that there is a closure defect.

In EP-A-596 070 said problem is solved by mounting on the lower edge of one of the two cowls a pivoting or sliding arm, which visibly hangs beneath the engine when the two cowls are lowered, but not locked. The indication of a closure fault can be further improved by adding a flag to the end of the pivoting or sliding arm.

According to EP-A-596 070, the cowls can only be locked after the operator has manually raised the arm in order to house it on a receptacle provided for this purpose. When locking takes place, a pin linked with the opposite cowl penetrates the arm in order to maintain it in its retracted position. When the cowls are unlocked, a spring automatically brings the arm into its projecting position, which is visible from the outside.

The presence of such an indicator beneath the cowls equipping an aircraft engine prevents a defective or non-existent actuation of the locking mechanisms. However, this indicator suffers from a certain number of disadvantages.

Firstly, in the most frequent case where the engine is installed beneath the aircraft wing, the cowl locking mechanism is positioned below the engine, at a point very close to the ground and therefore difficult of access. When the operator opens or closes the cowls, he has to crouch in order to manipulate the locking mechanisms. The arm added to the locking mechanism according to EP-A-596 070 then constitutes a projecting part, which is added to other contusive parts of the engine and may injure the operator.

Moreover, when the cowls are closed again, the indicator described in EP-A-596 070 makes it necessary for the operator to raise the arm whilst locking the cowls. This operation is particularly irksome and difficult to perform in the position which he occupies.

In addition, the indicator described in EP-A-596 070 significantly complicates the existing locking mechanisms, because it requires the addition of two separate parts to the two cowls, as well as an alignment between the pin ensuring the locking of the arm in the retracted position and the hole formed in the arm for receiving said pin. This operation can prove irksome, bearing in mind the wear and clearance assumed by the parts when in use.

DESCRIPTION OF THE INVENTION

The invention relates to a closure fault indicator making such a fault clearly visible and whilst obviating the disadvantages of the indicator described in EP-A-596 070, i.e. in particular by not complicating either manufacture or use of the locking mechanism.

According to the invention, this result is obtained by means of a closure fault indicator for locking means interposed between two elements able to occupy with respect to one another an open position and a closed position, said indicator being characterized in that it comprises retractable abutment means able to automatically maintain the two elements spaced from one another during a passage from the open position into the closed position.

Advantageously, the indicator is arranged in such a way that the locking means can only be closed when the abutment means are retracted.

Moreover, said arrangement is preferably such that the abutment means can only be retracted by a deliberate action on the part of an operator. This deliberate action can be carried out by using a suitable tool.

According to a preferred embodiment of the invention, the retractable abutment means comprise at least one abutment member displaceable between a stable position in which the mobile element automatically bears against the abutment member when it moves from its open position into its closed position, and an unstable state in which the mobile element can move into its closed position.

Advantageously, elastic means then urge the abutment member towards its stable state.

The abutment member can in particular be fitted so as to be able to pivot about a fixed axis, in order to move from its stable state into its unstable state and vice versa.

In the particular case where the two elements are mobile, the retractable abutment means comprise two abutment members, each of which is allocated to one of the elements.

The two abutment members can then be installed so as to be able to pivot about the same fixed axis.

According to a preferred application of the invention, the two elements are pod cowls of an aircraft engine.

In this case, the borders or edges of the cowls, which can be retracted when said cowls are in the closed position and which are visible when they are kept spaced by retractable abutment means, incorporate means able to increase the visibility thereof, such as fluorescent paint or a bright colour.

BRIEF DESCRIPTION OF THE DRAWINGS

A preferred embodiment of the invention is described in greater detail hereinafter with reference to the attached drawings, wherein show.

DETAILED DESCRIPTION OF A PREFERRED EMBODIMENT OF THE INVENTION

Figure 1:
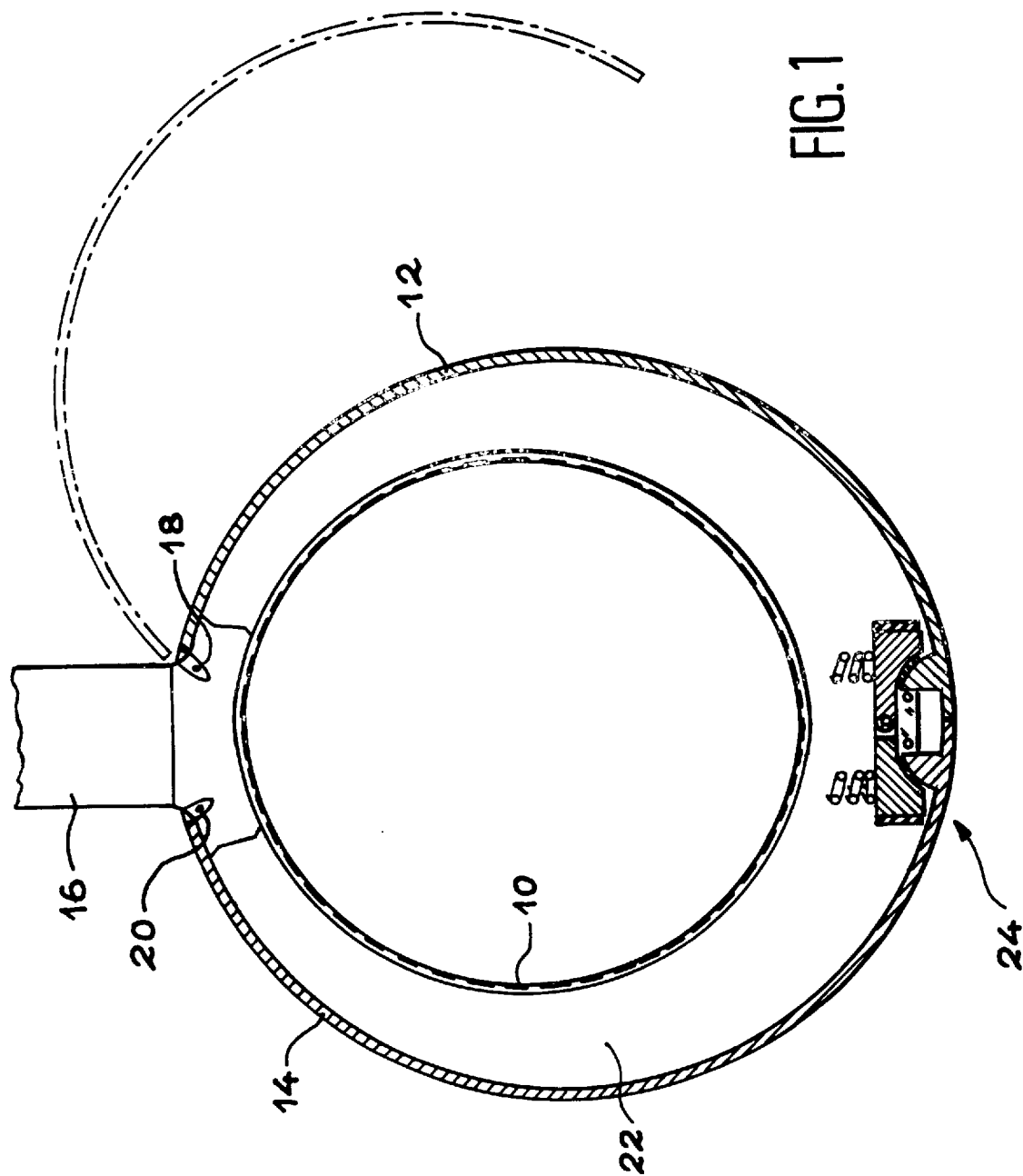
FIG. 1 A diagrammatic cross-sectional view of an aircraft engine pod, to the right of a pair of cowls equipping the same and facing towards the front of the engine, a closure fault indicator according to the invention being interposable between the bottom ends of the cowls.

As is very diagrammatically illustrated in FIG. 1, the pod of a ducted turbofan engine is conventionally defined towards the inside, to the right of the not shown fan, by a fan case 10 and towards the outside by two cowls 12 and 14, respectively to the right and left. Each of the cowls 12 and 14 is essentially shaped like a C or a half-circle, in cross-section in a plane perpendicular to the longitudinal axis of the engine.

Each of the cowls 12 and 14 is articulated by its upper edge to a strut 16 by which the engine is suspended beneath the wing of an aircraft. More specifically, the upper edge of each of the cowls 12 and 14 is connected to the strut 16, in the upper portion of the engine, by a respective hinge 18, 20, whose axis is substantially parallel to the longitudinal axis of the engine. As is diagrammatically shown in mixed line form in FIG. 1 for the right-hand cowl 12, this arrangement makes it possible to raise each of the cowls 12 and 14 in order to give access to various not shown equipments of the engine, which are traditionally installed in the annular space 22 defined within the pod between the fan case 10 and the cowls.

When the cowls 12 and 14 occupy their closed position, illustrated in continuous line form in FIG. 1, they are normally locked by not shown locking means, such as several knuckle joint mechanisms or the like, comparable to the mechanism described in U.S. Pat. No. 4,531,769 and interposed between the lower edges of the cowls.

To prevent an operator forgetting to actuate the locking means or failing to actuate them in a satisfactory manner, between the facing lower edges of the cowls 12 and 14 is positioned a closure fault indicator, designated in general terms by the reference numeral 24.

Figure 2:
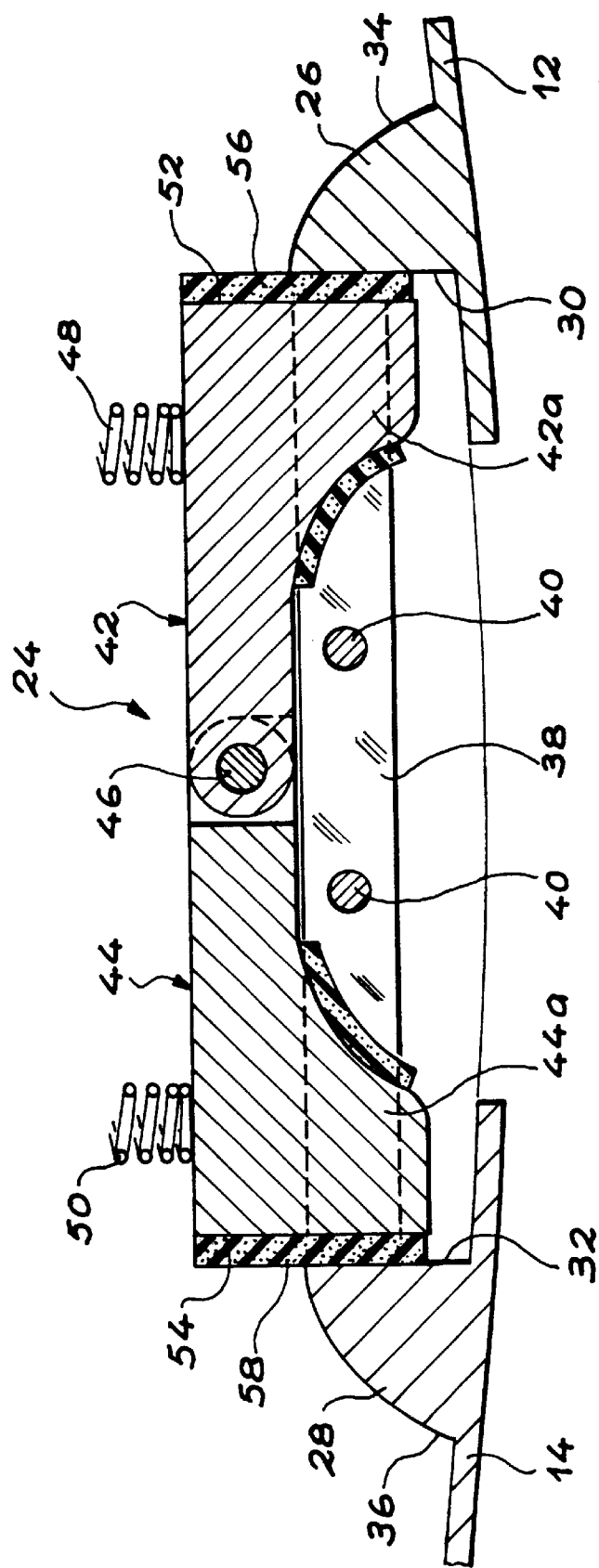
FIG. 2 A larger scale sectional view of a preferred embodiment of a closure fault indicator according to the invention, in the state occupied by it when the cowls are in the bottom closure position, but when the locking means have not been actuated.
Figure 3:
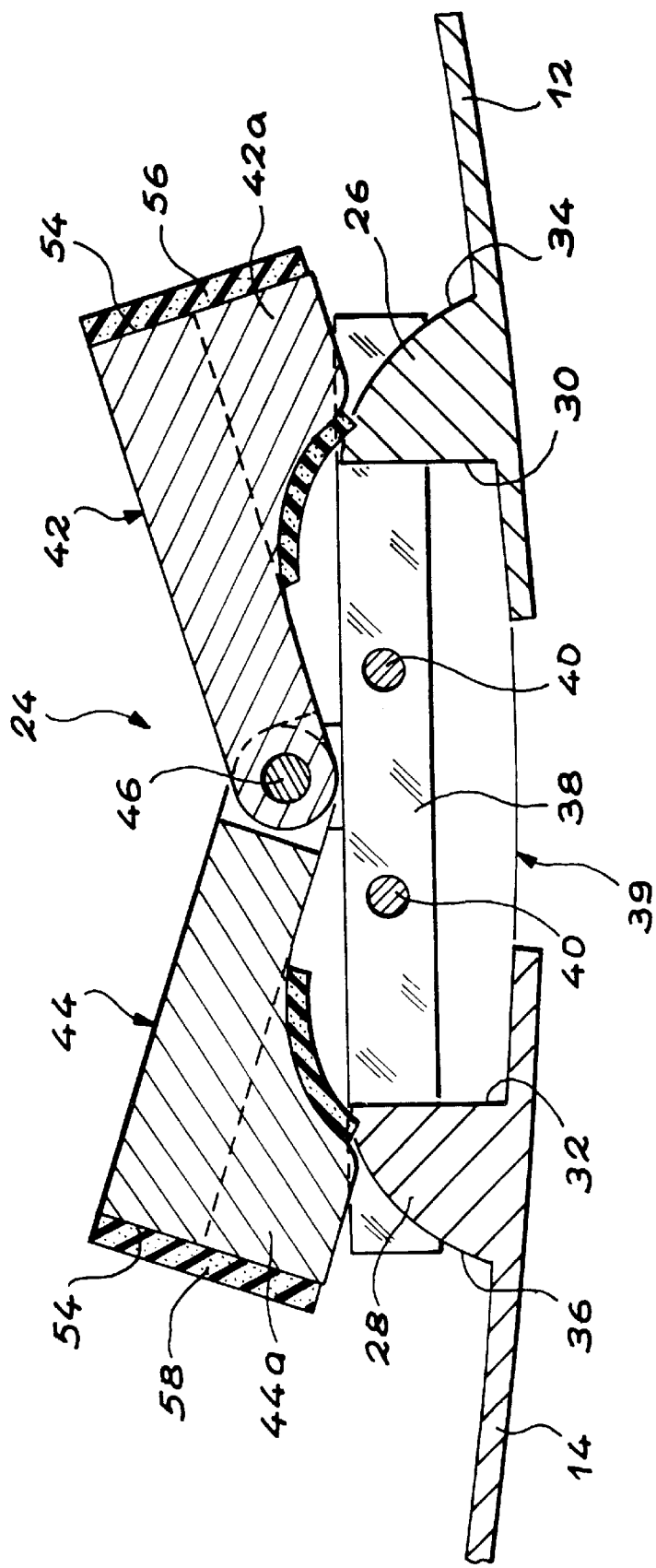
FIG. 3 A view comparable to FIG. 2, illustrating the retraction of the abutment means equipping the indicator, for putting the locking means into action.
Figure 4:
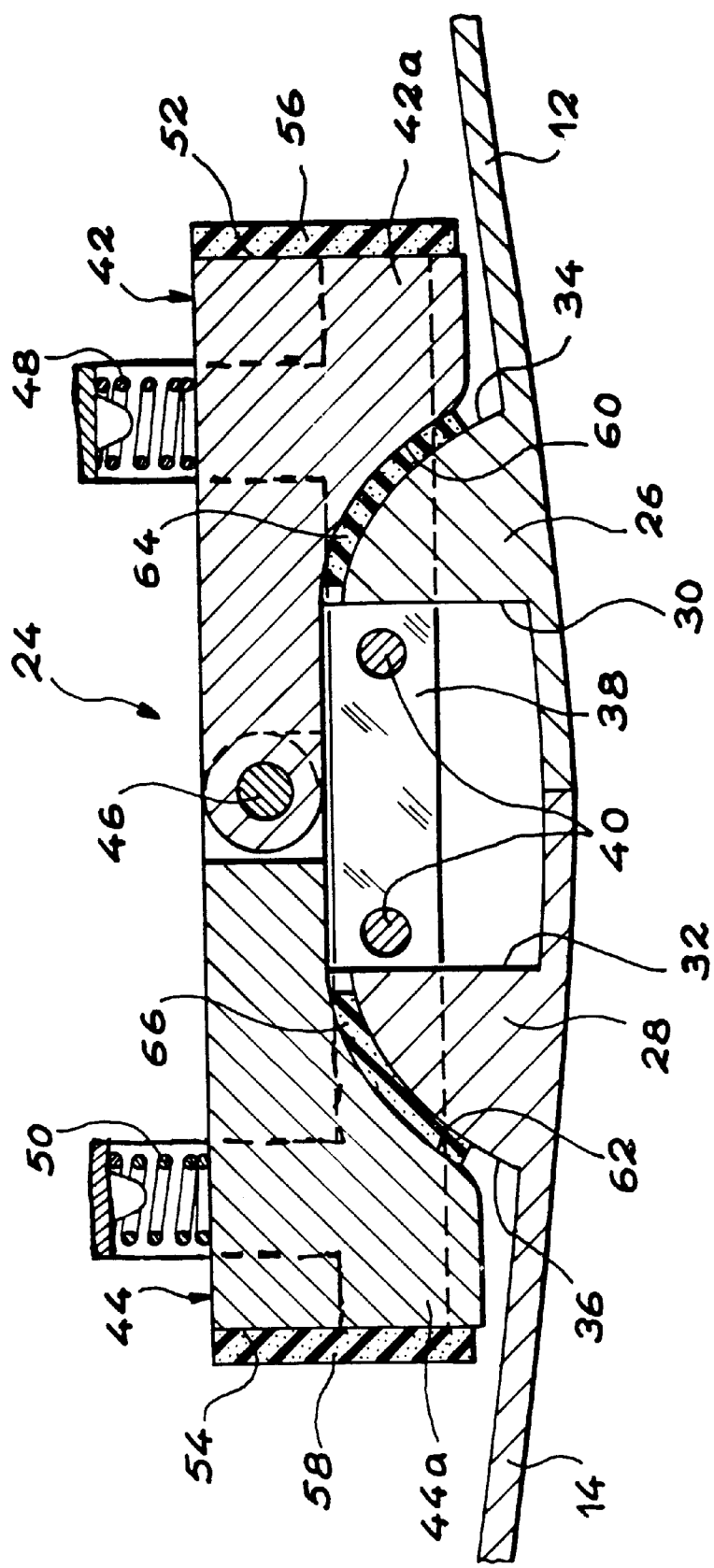
FIG. 4 A comparable sectional view to FIGS. 2 and 3, illustrating the indicator when the locking means have been actuated.
Figure 5:
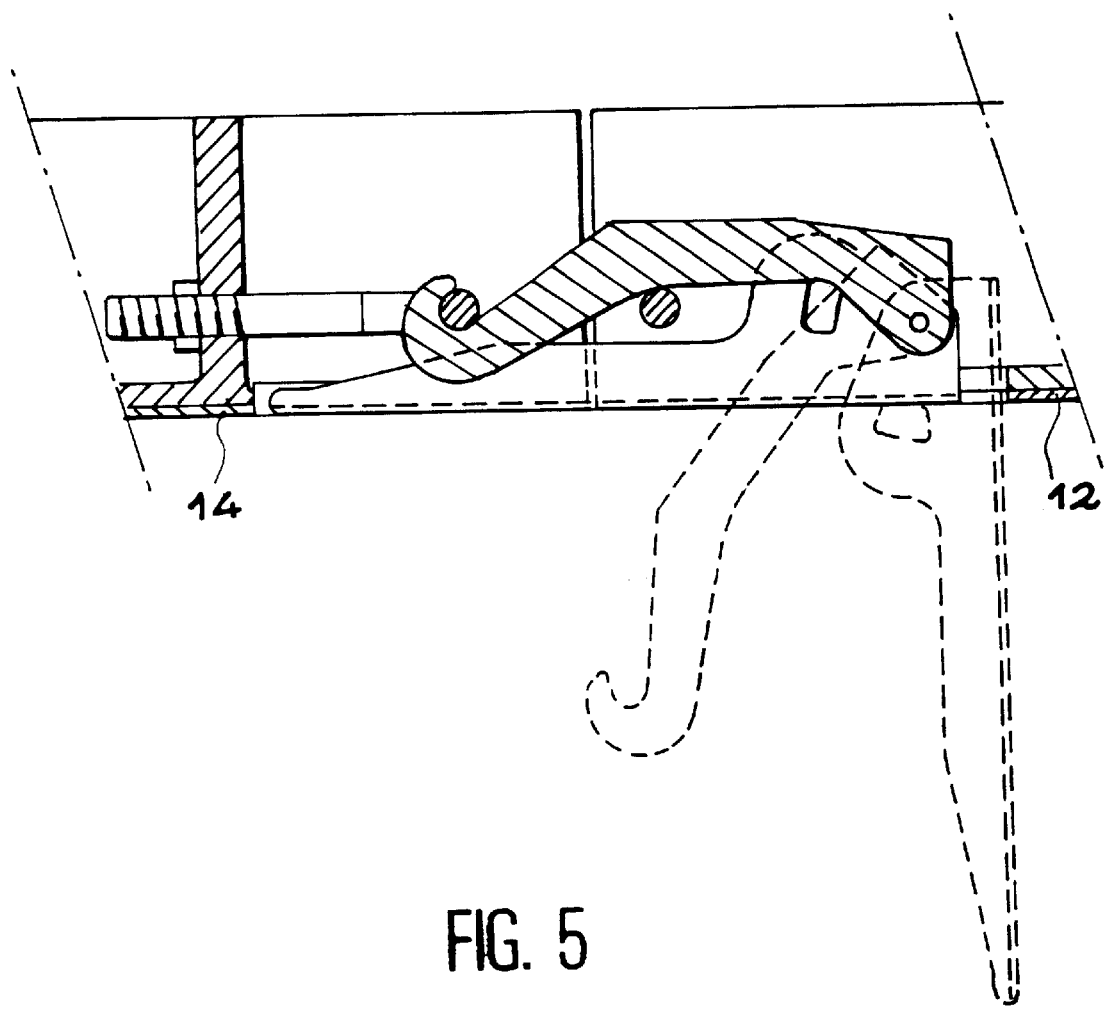
FIG. 5 A sectional view of an exemplary locking means that can be used with the invention.

A preferred embodiment of said closure fault indicator 24 will now be described in detail with reference to FIGS. 2 to 4. In FIGS. 2 to 4 it can be seen that the lower edges of the cowls 12 and 14 are internally equipped at their front end close to the pod air intake, with a stud 26, 28 respectively. It should be noted that these studs 26 and 28 already exist in this form on existing engine pod cowls.

The faces 30 and 32 of the studs 26 and 28, which are turned towards one another when the cowls 12 and 14 are in the closed position, are planar. These faces 30 and 32 are also substantially parallel to a median vertical plane passing through the longitudinal axis of the engine, when the cowls are in the closed position.

The opposite faces of the studs 26 and 28, designated by reference numerals 34 and 36 in FIGS. 2 to 4, have substantially quarter circle-shaped cross-sections and the centre thereof is located approximately at the intersection of the corresponding planar face 30, 32 with the inner face of the cowl 12, 14 carrying the stud in question.

FIGS. 2 to 4 also show a front guide 38 fixed in the base of the rear face of the pod air intake 39. This front guide 38 is connected by bolts 40 to a not shown rear guide, so as to define between the two guides right and left-hand gaps, which normally receive the studs 26 and 28 when the cowls 12 and 14 are in the closed position (FIG. 4).

In the preferred embodiment of the invention illustrated in FIGS. 2 to 4, the closure fault, indicator 24 is fitted directly to the front guide 38 and takes advantage of the presence of the studs 26 and 28 in the vicinity of the lower edge of each of the cowls 12 and 14.

In this case the closure fault indicator 24 comprises two abutment members 42, 44, which are respectively to the right and left and which constitute retractable abutment means able to automatically maintain the cowls 12 and 14 spaced from one another, when they move from their open position into their closed position. More specifically, the two abutment members 42 and 44 are fitted in pivoting manner to the front guide 38 by means of a common pin 46 placed above the guide 38, in the median vertical plane of the engine passing through the longitudinal axis thereof and oriented parallel to said axis.

Each of the abutment members 42 and 44 comprises a bottom part 42a, 44a which can be placed in the gap, formed between the front guide 38 and the not shown rear guide and which receive the studs 26 and 28 when the cowls are closed. The abutment members 42, 44 then occupy a bottom position, as illustrated in FIGS. 2 and 4. This bottom position constitutes a stable position towards which they tend to return under the action of gravity and under the action of elastic means such as springs 48 and 50 diagrammatically illustrated in FIGS. 2 and 4.

When the abutment members 42, 44 occupy said bottom position, they respectively extend to the right and to the left in a substantially horizontal direction, on either side of the common pivot pin 46 thereof. The end faces 52 and 54 of the members 42 and 44, opposite to the pivot pin 46, form planar abutment faces, which are then oriented parallel to one another and to the median vertical plane passing through the longitudinal axis of the engine.

Under these conditions, due to the fact that the lower portion 42*a*, 44*a* of each of the abutment members 42, 44 then penetrates the gap provided for the reception of the studs 26, 28, the planar faces 30, 32 of said studs automatically bear against the abutment faces 52, 54 of the members 42, 44 during the closure of the cowls 12, 14. This situation is illustrated in FIG. 2, so that part of the leading edge of each of the cowls 12, 14 is then clearly visible to an observer positioned in front of the engine air intake. Thus, the observer is immediately informed of the fact that the locking mechanisms have not been actuated. It is consequently virtually impossible to forget to lock the cowls.

This information can be further improved by placing on the edges of the cowls, which then project beyond the air intake with means able to improve their visibility, such as a fluorescent paint, a bright colour, or any other coating or treatment able to attract the eye of even an inattentive observer.

The abutment members 42, 44 can be made from a random, sufficiently strong material so as not to wear excessively rapidly on contact with the studs 26, 28. In non-limitative manner, said material can in particular be stainless steel. Protection parts 56, 58, e.g. of rubber, can be joined to the faces 52, 54, or optionally to the abutment faces 30, 32 of the studs 26, 28, in order to further improve the wear resistance.

When an operator wishes to lock the cowls with the aid of the locking mechanisms equipping the lower borders thereof, he pushes upwards the abutment members 42, 44 in opposition to springs 48 and 50 into an unstable position illustrated in FIG. 3. This operation can be carried out without an particular difficulty, .e.g. using a tool.

When the abutment members 42, 44 have pivoted sufficiently far up about their common pin 46, the cowls 12 and 14 can end their downward pivoting about their hinges 18, 20 (FIG. 1). Thus, the lower portions 42*a*, 44*a* of the abutment members 42, 44 then free the gaps formed between the front guide 38 and the not shown rear guide, so that the studs 26, 28 penetrate these gaps. Simultaneously, the operator actuates the not shown locking mechanisms.

As illustrated in FIG. 4, the lower edge of each of the abutment members 42, 44 has a hollowed out portion 60, 62, having a circular arc cross-section and which automatically houses the corresponding stud 26, 28 under the action of a further downward tilting of the abutment members 42, 44 controlled by the springs 48, 50, when the cowls 12, 14 are closed and locked.

Protection blocks 64, 66, e.g. of rubber can also be joined within the hollowed out portion 60, 62 or to the surfaces 34, 36 of the studs, in order to prevent excessively rapid wear of the different parts.

The cowls 12, 14 are opened in the conventional manner by unlocking the locking mechanisms, then moving apart the lower edges of the cowls by making them pivot about the hinges 18, 20 (FIG. 1). The cooperation of faces 34, 36 of studs 26, 28 and the hollowed out portions 60, 62 of the abutment members 42, 44 then has the effect of pivoting the latter upwards in opposition to the return springs 48, 50. As soon as the studs 26, 28 are no longer in contact with the abutment members 42, 44, the latter drop back into their stable position illustrated in FIGS. 2 and 4. They then automatically prevent the complete closure of the cowls without external intervention, as explained hereinbefore.

It should be noted that the indicator according to the invention can be fitted to an existing engine in the same way as to a new engine, without it being necessary to modify the cowls or add parts. Thus, the conventional front guide is merely replaced by the guide 38 carrying the abutment members 42, 44.

Obviously the embodiment described only constituted an example, which can undergo numerous modifications without passing outside the scope of the invention. Thus, even if the invention is particularly appropriate for aircraft engine pod cowls, it can be used in numerous other applications, where there is a risk of forgetting to lock a door in the closed position. In this case, the elements to be locked can comprise a fixed element and a mobile element.

Furthermore, instead of pivoting on the same pin, the abutment members can pivot about two separate pins or can be replaced by one or two members able to slide vertically between an unstable, upper position and a stable, lower position. The return means, constituted in the example described by helical compression springs, can be replaced by any other technically equivalent members such as leaf springs.

What is claimed is:

1. Indicator of a closure fault for locking means interposed between two aircraft engine pod cowls able to occupy with respect to one another an open position and a closed position, said indicator comprising retractable abutment means able to automatically maintain the two aircraft engine pod cowls spaced from one another, during a passage from the open position into the closed position.

2. Indicator according to claim 1, wherein the locking means can only be closed when the abutment means are retracted.

3. Indicator according to claim 1, wherein the abutment means can only be retracted by a deliberate action of an operator.

4. Indicator according to claim 1, wherein the retractable abutment means comprise at least one abutment member displaceable between a stable state in which the aircraft engine pod cowl automatically bears against said abutment member when it moves from its open position into its closed position, and an unstable state, where said aircraft engine pod cowl can move into its closed position.

5. Indicator according to claim 4, wherein an elastic means urges said abutment member towards its stable state.

6. Indicator according to claim 4, wherein said abutment member is able to pivot about a fixed axis in order to move from its stable state to its unstable state and vice versa.

7. Indicator according to claim 6, wherein both of said aircraft engine pod cowls are mobile and the retractable abutment means comprise two abutment members, each of which is allocated to one of said aircraft engine pod cowls.

8. Indicator according to claim 7, wherein the two abutment members are able to pivot about the same fixed axis.

9. Indicator according to claim 8, wherein borders of the cowls, which can be retracted when the cowls are in the closed position and which are visible when they are kept spaced by retractable abutment means, incorporate means able to increase the visibility hereof.

10. Indicator of a closure fault for two aircraft engine pod cowls, the cowls able to occupy with respect to one another an open position and a closed position, said indicator comprising:

retractable abutment means able to automatically maintain the two aircraft engine pod cowls spaced from one another, during a passage from the open position into the closed position;

the retractable abutment means comprising:

at least two abutment members displaceable between a stable state in which the aircraft engine pod cowl automatically bears against said one of the abutment members when it moves from its open position into its closed position, and an unstable state, where said aircraft engine pod cowl can move into its closed position;

wherein said abutment members are operable to pivot about a fixed axis in order to move from the stable state to its unstable state and vice versa; and wherein both of said aircraft engine pod cowls are mobile and the each of the two abutment members engages one of said aircraft engine pod cowls.

* * * * *